United States Patent [19]

Kas

[11] Patent Number: 4,738,141

[45] Date of Patent: Apr. 19, 1988

[54] PRESSURE SENSOR

[75] Inventor: Gunter Kas, Stuttgart, Fed. Rep. of Germany

[73] Assignee: Robert Bosch GMBH, Stuttgart, Fed. Rep. of Germany

[21] Appl. No.: 942,652

[22] Filed: Dec. 17, 1986

[30] Foreign Application Priority Data

Apr. 2, 1986 [DE] Fed. Rep. of Germany ....... 3610946

[51] Int. Cl.$^4$ .............................. G01L 7/04; G01L 9/10
[52] U.S. Cl. ......................................... 73/735; 73/739; 73/743; 338/32 H
[58] Field of Search .................. 73/735, 739, 741, 743, 73/742, 708; 338/32 H

[56] References Cited

U.S. PATENT DOCUMENTS 2,810,800 10/1957 Hasselhorn .
3,527,100 9/1970 Talmo et al. ........................... 73/398
4,529,961 7/1985 Nishimura et al. ................ 73/146.5
4,667,514 5/1987 Baer ..................................... 73/728

FOREIGN PATENT DOCUMENTS 1955496 7/1970 Fed. Rep. of Germany .

Primary Examiner—Donald O. Woodiel

[57] ABSTRACT

An improved pressure sensor includes a Bourdon tube, as its sensing element, and an indicator controlled thereby. At least one tightly closed container is secured to a free end of the Bourdon tube and is partly filled with a bulk material. If the Bourdon tube is made to vibrate as a result of pressure shocks or vibration forces acting upon its fixed end frictional forces that consume vibration energy arise between the container and the amounts of bulk material contained. The indicator includes Hall elements and permanent magnets, which magnets are secured on the Bourdon tube and are moved by it relative to the Hall elements.

15 Claims, 1 Drawing Sheet

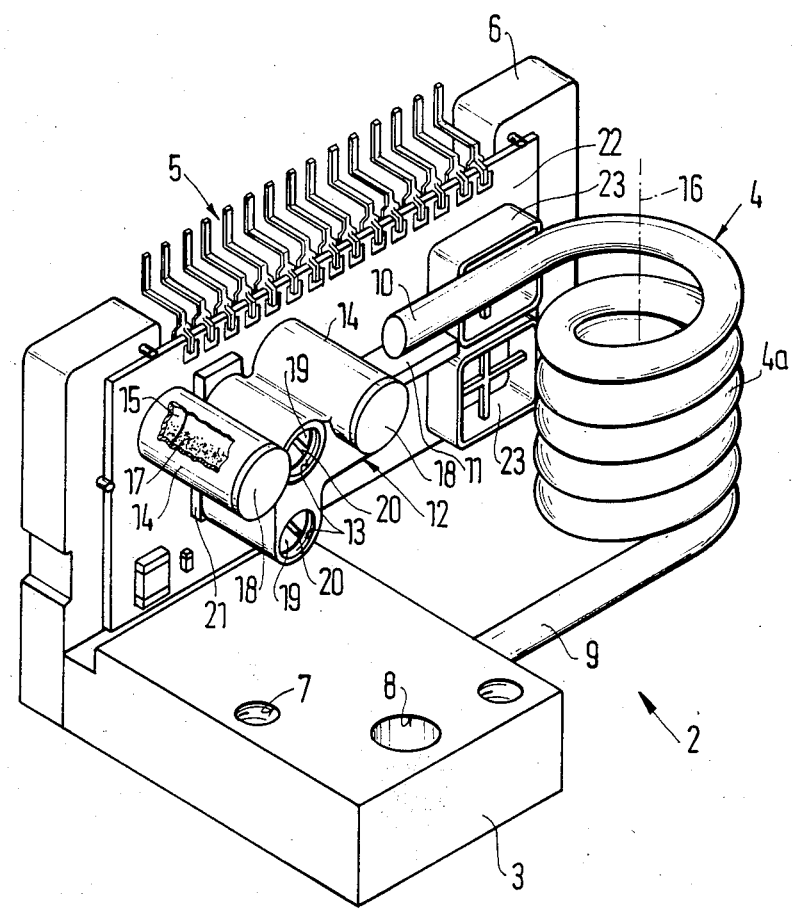

PRESSURE SENSOR

BACKGROUND OF THE INVENTION

The invention is directed to improvements in pressure sensors having Bourdon tubes adapted to serve as an indicator means.

From U.S. Pat. No. 2,810,800, a pressure sensor is known that has a Bourdon tube curved into a helix with one fastened end and one freely movable end, which acts upon an indicator. The indicator comprises electrical contracts that are movable relative to on another. Wearing of the contacts is a disadvantage. Pressure shocks that reach the Bourdon tube and jarring affecting the pressure sensor cause vibration of the Bourdon tube and result in increased wear and incorrect indications.

In a pressure sensor known from German Auslegeschrift No. 19 55 496, a free end of a Bourdon tube acts via a wire on a free end of an elastically flexible arm the other end of which is fixed. Two strain gauges act as a contactless indicator and are part of a bridge circuit. When the arm bends elastically, this stretches one of the strain gauges elastically while compressing the other. This indicator operates in a wear-free manner. However, it is technologically difficult and expensive to fasten the wire to the Bourdon tube and th arm and there is also the danger that the wire will break during operation especially at times when the Bourdon tube begins to vibrate. The Bourdon tube itself can also be damaged or even rendered useless by vibration. No mechanical adjusting means are available, for example for performing a null drift adjustment of the indicator. As a result, a null drift adjustment can be attained only by mean of wiper contact of adjustable resistors built into the bridge circuit. Disposing transition resistors, which are vulnerable to aging, at the wiper contacts can lead to errors in measurement.

OBJECT AND SUMMARY OF THE INVENTION

The pressure sensor has the advantage of damping vibration resulting from pressure shocks reaching the Bourdon tube or from jarring that affects the pressure sensor. Because of the damping, damage to the components of the pressure sensor is avoided. The vibration damping has the further advantage that measurement value indications have smaller vibration deflection and so are more easily and more accurately evaluated.

If two or more damping containers filled with bulk material are provided as described hereinafter, the reliability of the sensor is increased even at freezing temperatures. At such temperatures, if only one such container were used, its contents would freeze to the container if any moisture should get in, with the result that there would be no vibration damping. When more than one container is used, the total absence of the vibration damping is highly unlikely, because moisture would have to get into all the containers. Providing more than one container has the additional advantage that the bulk material is distributed in a constantly uniform manner over more wall area, so as to generate more frictional work. Also, the containers can be filled with different vibration-damping materials. Provisions are described for reinforcing the vibration damping and making it uniform, and means that enable economical manufacture of the containers are described. In another feature of the invention costly movable coupling means, which are therefore vulnerable to malfunction, can be dispensed with between the Bourdon tube and the indicator. The invention also provides for adjustment, for instance a null drift adjustment, of the pressure sensor in a simple and inexpensive manner. Provisions for convenient and durable adjustment are also described.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing shows an exemplary embodiment of the pressure sensor according to the invention.

DESCRIPTION OF THE PREFERRED EMBODIMENT

The example of a pressure sensor 2 shown has a base plate 3, a Bourdon tube 4, an indicator 5 and a securing plate 6 for the indicator 5.

The base plate 3 has securing holes 7 and a pressure connection hole 8. One end 9 of the Bourdon tube 4 is secured tightly in the base plate 3 and communicates with the pressure connection hole 8. A free end 10 of the Bourdon tube 4 is joined to a securing flange 11. The free end 10 is closed, for example by welding. The securing flange 11 may likewise be secured to the end 10 by welding. The securing flange 11 bears a component 12 that for example unites two threaded holes 13 and two containers 14 in itself.

The containers 14 are substantially cylindrical and each has a bottom 15 on one end. The longitudinal axes of the containers 14 intersect a winding axis 16 of the Bourdon tube 4 substantially at right angles at various distances from it. The containers 14 are partly filled with a bulk material 17 serving as a damping means. Quartz sand, for example, may be used as the bulk material. The bulk material may also comprise metal chips or metal beads, as an example. The containers 14 are sealed in an airtight and moistureproof manner by means of caps 18. The two containers 14 may be filled with different amounts and/or different types of bulk material 17. By way of example, the containers 14 may also be of different lengths.

The threaded holes 13 ar disposed substantially parallel to the containers 14. These threaded holes 13 receive substantially bar-shaped permanent magnets 19. These permanent magnets each have an external thread, which fits into the associated threaded hole 13, where friction makes them self-locking. The permanent magnets 19 have screw slots 20 so that they can be introduced into the holes and adjusted by means of a tool. Hall elements 21 are disposed in the extension of the permanent magnets 19. The Hall elements are for example secured on a printed circuit 23, which in turn is fastened to the securing plate 6. The securing plate 6 is in turn combined with the base plate 3, so that the orientation of the fixed end 9 of the Bourdon tube 4 with respect to the Hall elements 21 is constant. The printed circuit 22 includes signal evaluation elements, not shown, such as an operational amplifier and two switch amplifiers 23, for example, controlled by the operational amplifier.

When pressure is introduced through the pressure connection hole 8 into the Bourdon tube 4, the windings 4a of the tube are expanded in a elastically resilient manner, causing the free end 10 of the Bourdon tube 4 to approach the printed circuit 22. The result is that the existing distances between the permanent magnets 19 and the Hall elements 21 become shorter. The shortening of these distances causes changes in voltage at outputs, not shown, of the Hall elements 21. These voltage changes are evaluated by the printed circuit 22 and if the voltage exceeds or drops below predetermined thresholds, for example, they bring about the activation of the switching amplifiers 23. One of the Hall elements 21, for example, is intended for switching on a pump, via one of the switching amplifiers 23. The other Hall element 21 is for example intended for switching this pump back off again, once it has charged a reservoir, not shown, to a desired pressure. Because of the disposition of the threaded holes 13 and the embodiment of the permanent magnets 19 adapted to it, and because of the disposition of the screw slots 20 on these permanent magnets 19, the pressures that activate the switching amplifier can be adjusted conveniently. Once adjusted, the settings are maintained, because as noted above the permanent magnets 19 are disposed in the threaded holes 13 in a self-locking manner.

It cannot be avoided that pressure shocks will reach the Bourdon tube 4 and/or that jarring from outside will affect the pressure sensor 2. This causes both the free end 10 of the Bourdon tube 4 and the component 12 to vibrate, which causes changes in the spacing between the permanent magnets 19 and the Hall elements 21. The containers 14 are accelerated back and forth in accordance with the vibrations. The bulk material 17 located in each of the containers 14 represents a deformable inertial mass, which changes its shape between the end positions of the vibration path. The necessary shape-changing energy for this, which is produced by friction between the particles of the bulk material 17 and as a result of the friction energy loss between the container wall 14 and the bulk material 17, is subtracted from the kinetic energy of the vibrating masses. Because of the different distances between the containers 14 and the winding axis 16 of the Bourdon tube 4, the amounts of bulk material 17 enclosed in containers of equal length will slosh back and forth differently, therefore producing different damping forces. As a result, vibration incited at certain frequencies is accordingly particularly effectively damped. As already indicated, the containers 14 may also be of different lengths, or may be filled with different amounts of the bulk material 17.

By attaching the containers 14 which act as a damping device, the inciting of Bourdon tube vibration near its natural vibration frequency in particular is effectively suppressed. The vibration damping that is attained causes smaller voltage deviations at the outputs of the Hall elements 21, so that these elements can be followed by simpler and less expensive filters. The damping attained also avoids plastic deformations of the Bourdon tube 4 or permanent breakage from excessive alternating flexing strain on the tube. The pressure sensor 2 is therefore particularly suitable for use in motor vehicles, where jarring resulting from vibration in a driving motor and in the vehicle chassis can normally be very disruptive. The pressure sensor 2 described here may for example be a component of a motor vehicle brake system. It does not matter here whether the pressure sensor 2 controls the charging of external energy reservoirs of the brake system or is used to regulate brake pressures to those pressures selected by the driver. It should also be noted that providing multiple containers 14 along with the material filling them has the advantage that if a container accidentally leaks and moisture gets into it, total failure of the damping at freezing temperatures cannot occur.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A pressure sensor comprising a Bourdon tube, one end of said Bourdon tube being fixed, said Bourdon tube further including a free end associated with a contactless indicator, said contactless indicator including a tightly closed container and said container being at least partially filled with a damping agent comprising a bulk material.

2. A pressure sensor as defined by claim 1 in which at least one additional container having bulk material is associated with said movable free end of said Bourdon tube.

3. A pressure sensor as defined by claim 2, in which said containers are of different lengths in their directions of movement.

4. A pressure sensor as defined by claim 3, in which said containers are filled with different amounts of said bulk material.

5. A pressure sensor as defined by claim 4, in which said indicator further comprises at least one Hall element disposed in a fixed manner and at least one permanent magnet joined to said movable free end of said Bourdon tube.

6. A pressure sensor as defined by claim 3, in which said containers are filled with different types of bulk material.

7. A pressure sensor as defined by claim 3, in which said indicator further comprises at least one Hall element disposed in a fixed manner and at least one permanent magnet joined to said movable free end of said Bourdon tube.

8. A pressure sensor as defined by claim 2, in which said containers are filled with different amounts of said bulk material.

9. A pressure sensor as defined by claim 8, in which said containers are filled with different types of bulk material.

10. A pressure sensor as defined by claim 8, in which said indicator further comprises at least one Hall element disposed in a fixed manner and at least one permanent magnet joined to said movable free end of said Bourdon tube.

11. A pressure sensor as defined by claim 2, in which said containers are filled with different types of bulk material.

12. A pressure sensor as defined by claim 2, in which said indicator further comprises at least one Hall element disposed in a fixed manner and at least one permanent magnet joined to said movable free end of said Bourdon tube.

13. A pressure sensor as defined by claim 1, in which said indicator further comprises at least one Hall element disposed in a fixed manner and at least one permanent magnet joined to said movable free end of said Bourdon tube.

14. A pressure sensor as defined by claim 13, in which said at least one permanent magnet is disposed such that it is adjustable relative to the Hall element by a threaded means.

15. A pressure sensor as defined by claim 14, in which said permanent magnet is secured by means of a self-locking threaded means.

* * * * *